US006039246A

United States Patent [19]
Mukai

[11] Patent Number: 6,039,246
[45] Date of Patent: Mar. 21, 2000

[54] NOTES ACCEPTING APPARATUS

[75] Inventor: Masanori Mukai, Kawasaki, Japan

[73] Assignee: Fujitsu Limited, Kawasaki, Japan

[21] Appl. No.: 08/875,780

[22] PCT Filed: Dec. 6, 1996

[86] PCT No.: PCT/JP96/03589

§ 371 Date: Aug. 5, 1997

§ 102(e) Date: Aug. 5, 1997

[87] PCT Pub. No.: WO97/22090

PCT Pub. Date: Jun. 19, 1997

[30] Foreign Application Priority Data

Dec. 8, 1995 [JP] Japan .................................... 7-320242

[51] Int. Cl.[7] ...................................................... G06F 17/60

[52] U.S. Cl. ............................................................ 235/379

[58] Field of Search ................................ 235/379; 902/1, 902/41; 209/534

[56] References Cited

U.S. PATENT DOCUMENTS

| | | | |
|---|---|---|---|
| 4,473,157 | 9/1984 | Hirose et al. . | |
| 4,694,963 | 9/1987 | Takesako . | |
| 5,051,900 | 9/1991 | Ito et al. | 364/408 |
| 5,186,334 | 2/1993 | Fukudome et al. | 209/534 |
| 5,247,159 | 9/1993 | Yuge et al. | 235/379 |
| 5,850,076 | 12/1998 | Morioka et al. | 235/379 |

FOREIGN PATENT DOCUMENTS

| | | |
|---|---|---|
| 0 081 433 | 6/1983 | European Pat. Off. . |
| 59-096667 | 6/1984 | Japan . |
| 4-073279 | 6/1992 | Japan . |
| 5-020174 | 3/1993 | Japan . |

*Primary Examiner*—Thien M. Le
*Assistant Examiner*—Daniel H. Sherr
*Attorney, Agent, or Firm*—Staas & Halsey, LLP

[57] ABSTRACT

Disclosed is a notes accepting apparatus capable of immediately notifying a management person of a forged notes being used. The notes accepting apparatus is constructed such that the notes inserted as those that should be accepted, are classified into first type notes having a high probability of being accepted, second notes having a high probability of being forged notes, and third notes having smaller probability of being accepted than the first type notes and a smaller probability of being the forged notes than the second type notes, and information purporting that the forge notes are inserted is outputted when a predetermined number of the second type notes are contained in the notes inserted.

10 Claims, 6 Drawing Sheets

NOTES ACCEPTING APPARATUS

TECHNICAL FIELD

The present invention relates to a notes accepting apparatus for accepting notes such as paper money and also to, for example, a notes accepting apparatus used for actualizing an ATM (Automatic Teller's Machine).

BACKGROUND ARTS

In recent years, with advancements of automation in a variety of sectors, apparatuses have been automatically dealing with transactions using notes such as paper money, securities, certificates of tax payments, book coupons, beer coupons, a variety of tickets and admission tickets.

Specific constructions of such apparatuses (hereinafter termed notes accepting apparatuses) differ depending on kinds of the notes to be processed by the apparatuses. For instance, the notes accepting apparatus that treats paper money normally includes an inserting/discharging unit, a discriminating unit, a storing unit, a carry mechanism, a storing unit, an operation unit and a control unit.

The inserting/discharging unit is connected to the discriminating unit and to the storing unit via the carry mechanism for carrying the paper money, and functions as a inserting port and a discharging port for the paper money. The operation unit is a unit for transferring and receiving information between a user and the control unit, and has an information display function and an information input function.

The control unit controls each of the units, corresponding to an operation executed for the operation unit. For instance, when operating the operational unit to indicate a receipt of the paper money, the control unit controls the inserting/discharging unit to prepare for accepting the paper money. Then, when detecting a completion of the insertion of the paper money, the control units starts control to supply the discriminating unit with the paper money sheet by sheet from within the inserting/discharging unit. Note that this control is executed mainly for the carry mechanism provided between the inserting/discharging unit and the discriminating unit.

The discriminating unit discriminates a face value of a sheet of paper money carried by the carry mechanism from the inserting unit. Further, the discriminating unit makes a discrimination as to whether or not the paper money (note) carried is paper money to be treated by the notes accepting apparatus (which is hereinafter referred to as an appropriate paper money). Note that empirically prescribed discriminating conditions are given to the notes accepting apparatus in order not to accept forge paper money and not to discharge appropriate but stained and partially torn-up paper money.

Thereafter, the control unit controls the carry mechanism so that the paper money about which the discrimination by the discriminating unit has been finished, is carried to a unit corresponding to a result of the discrimination. More specifically, the control unit controls the carry mechanism so that the paper money discriminated as appropriate is stored in the storing unit according to a face value, while the paper money such as a heterogenous note mistakenly inserted and forge paper money, is returned to the inserting/discharging unit.

Further, the control unit, when operated to indicate the operation unit to pay the money, the control unit controls the respective units so that an indicated amount of paper money is taken out of the storing unit and carried to the inserting/discharging unit.

Now, the use of the forge notes is a criminal, and hence it is desirable that the notes accepting apparatus incorporates a function capable of detecting that the forge notes are used. However, the note discriminates as inappropriate by the discriminating unit can not be judged to be the forge note. Therefore, the prior art notes accepting apparatus has not function to judge from a result of the discrimination made by the discriminating unit whether or not the forge notes are inserted. The prior art notes accepting apparatus is, however, constructed so that data about a content of transaction are stored inside the apparatus. Hence, if it proves that the discriminating unit fails to discriminate with the result that the forge notes are accepted, pieces of information on the time when the forge notes are used and so on can be obtained from the data described above. In the case of the discriminating unit makes a successful discrimination even when the forge notes are inserted, however, it never happens that the forge notes are stored inside the apparatus. Accordingly, what is obtained in this case is just the information on the time at which to implement a transaction where the forge notes might have been used, i.e., the information unusable for verifying the criminal act.

Further, it has also been practiced that a video camera for monitoring is provided for recording a figure of the user of the notes accepting apparatus. A content of recording, however, comes to have a meaning only when the forge note happens to be accepted.

DISCLOSURE OF INVENTION

Under such circumstance, it is an object of the present invention to provide a notes accepting apparatus capable of immediately notifying a management person of the fact that a forge not is used.

To accomplish the above object, according to a first aspect of the present invention, a notes accepting apparatus comprises a holding unit for temporarily holding plural sheets of notes inserted, a fetching unit for fetching the plural sheets of notes sheet by sheet that have been held by the holding unit, a characteristic data outputting unit for outputting predetermined kinds of characteristic data about one sheet of note fetched by said fetching unit, a classifying unit for classifying the notes fetched by the fetching unit into any one type of notes among first type notes exhibiting a high probability of being accepted, second type notes exhibiting a high probability of being forge notes, and third type notes exhibiting a smaller probability of being accepted than the first type notes and a smaller probability of being the forge notes than the second type notes on the basis of the predetermined kinds of characteristic data outputted by the characteristic data outputting unit and predetermined condition data, a storing unit for storing the notes classified as the first-type notes by the classifying unit, a counting unit for counting the number of sheets of the notes classified as the second type notes by the classifying unit during a period till the fetching unit fetches all of plural sheets of the notes held by the holding unit, and an information outputting unit for outputting information purporting that the forge notes are inserted when a count value by the counting unit exceeds a predetermined value.

That is to say, in the notes accepting apparatus according to the first aspect, jus when a predetermined number of notes (the second type notes) having the high probability of being the forge notes are contained in the notes inserted into the holding unit, there is outputted information (a so-called alarm) purporting that the forge notes are inserted. Therefore, when the forge paper money is inserted into the present notes accepting apparatus, it follows that a management person is able to immediately take a measure against such an act. Further, the present notes accepting apparatus is constructed to output the alarm not at a stage where one sheet of paper money having the high probability of being the forge paper money is detected but at a stage where a predetermined number of sheets of paper money are detected, and therefore has an extremely small possibility in which the alarm is mistakenly outputted.

Further, according to a second aspect of the present invention, a notes accepting apparatus comprises a holding unit for temporarily holding plural sheets of notes inserted, a fetching unit for fetching the plural sheets of notes sheet by sheet that have been held by the holding unit, a characteristic data outputting unit for outputting predetermined kinds of characteristic data about one sheet of note fetched by the fetching unit, a classifying unit for classifying the notes fetched by the fetching unit into any one type of notes among first type notes exhibiting a high probability of being accepted, second type notes exhibiting a high probability of being forge notes, and third type notes exhibiting a smaller probability of being accepted than the first type notes and a smaller probability of being the forge notes than the second type notes on the basis of the predetermined kinds of characteristic data outputted by the characteristic data outputting unit and predetermined condition data, a storing unit for storing the notes classified as the first type notes by the classifying unit, a judging unit for judging whether or not the notes classified as the second type notes by the classifying unit exist in the plural sheets of notes held by the holding unit, and an information outputting unit for outputting information purporting that the forge notes are inserted when the judging unit judges consecutively a predetermined number of times that the notes classified as the second type notes exist.

Namely, the notes accepting apparatus according to the second aspect outputs the alarm just when there consecutively appears a predetermined number of times such a phenomenon that the notes (the second type notes) exhibiting the high probability of being forge notes are contained in the notes inserted into the holding unit. In general, the user of the forge notes has tendency to try to use the forge notes several times even when the acceptance is rejected. Therefore, it follows that the present notes accepting apparatus operating in the way described above, is capable of precisely detecting that a small number of forge notes are used.

Moreover, according to a third aspect of the present invention, a notes accepting apparatus comprises a reference data storing unit for storing reference data, a holding unit for temporarily holding plural sheets of notes inserted, a fetching unit for fetching the plural sheets of notes sheet by sheet that have been held by the holding unit, a characteristic data outputting unit for outputting predetermined kinds of characteristic data about one sheet of note fetched by the fetching unit, a classifying unit for classifying the notes fetched by the fetching unit into any one type of notes among first type notes exhibiting a high probability of being accepted, second type notes exhibiting a high probability of being forge notes, and third type notes exhibiting a smaller probability of being accepted than the first type notes and a smaller probability of being the forge notes than the second type notes on the basis of the predetermined kinds of characteristic data outputted by the characteristic data outputting unit and predetermined condition data, a storing unit for storing the notes classified as the first type notes by the classifying unit, an information outputting unit for outputting information purporting that the forge notes are inserted when the reference data storing unit is stored with reference data conceived the same as the characteristic data of the notes classified as the second type notes by the classifying unit, and a writing unit for writing, when the reference data storing unit is not stored with the reference data conceived the same as the characteristic data classified as the second type notes by the classifying unit, the characteristic data as reference data to the reference data storing unit.

That is to say, in the notes accepting apparatus according to the third aspect, the alarm is outputted just when two sheets of notes having the high probability of being the forge notes and an extremely high approximation of the characteristic data, are contained in the notes inserted. Hence, it follows that the present notes accepting apparatus is capable of precisely detecting that the plural sheets of forge paper money created normally in the same procedures are used.

Note that the notes accepting apparatuses in the first through third embodiments may further comprise a classification control unit for controlling, when the classifying unit classifies the notes fetched by the fetching unit as the second type notes by use of the condition data, the classifying unit to perform the classification thereafter by use of second condition data having a narrower range of the characteristic data for being classified into the first type notes than the condition data.

In the notes accepting apparatus further comprising the classification control unit, the notes having the small probability of being accepted among the notes accepted in the states theretofore are not acceptable at a stage of recognizing a possibility in which the forge notes are used. It is therefore possible to obtain the notes accepting apparatus to which the classification control unit is added, whereby the possibility of mistakenly recognizing the forge paper money as appropriate and accepting it, is reduced.

The notes accepting apparatus according to the first aspect may further comprise a photographing unit for photographing a person who inserts the note into the holding unit, and a photography control unit for making the photographing unit function when the count value by the counting unit exceeds the predetermined value. Similarly, the notes accepting apparatus according to the second aspect may further comprise a photographing unit for photographing a person who inserts the note into the holding unit, and a photography control unit for making the photographing unit function when the judging unit judges consecutively a predetermined number of times that the notes classified as the second type notes exist.

BEST MODE FOR CARRYING OUT THE INVENTION

Embodiments of the present invention will hereinafter be specifically described with reference to the drawings.

<First Embodiment>

A notes accepting apparatus in a first embodiment is constructed to function as an ATM (automatic teller's machine).

Figure 1:
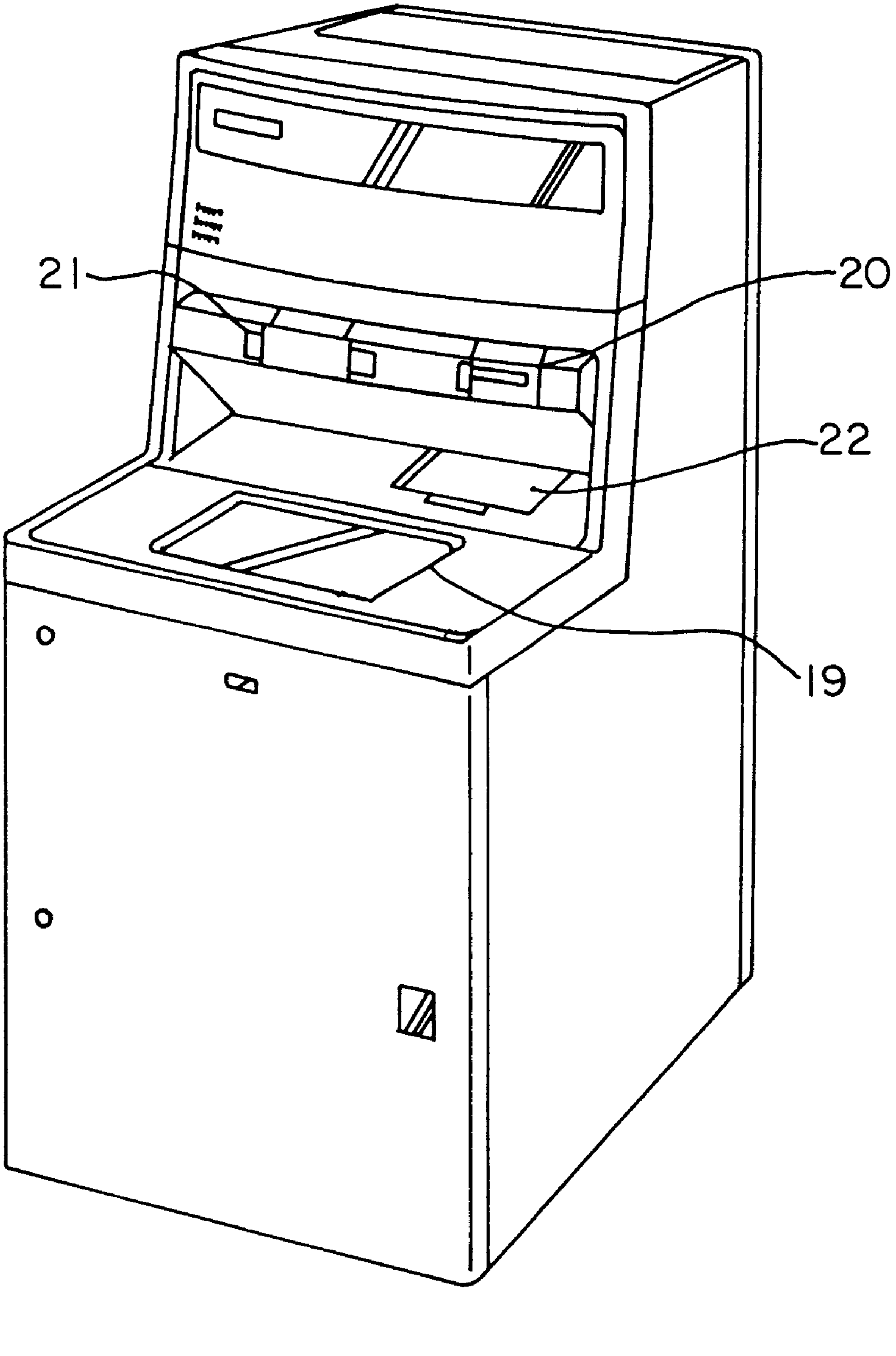
FIG. 1 is a view showing an external shape of a notes accepting apparatus in a first embodiment of the present invention.

FIG. 1 shows an outer appearance of the notes accepting apparatus in the first embodiment. As shown in the Figure, a box body of the notes accepting apparatus is provided with an operation unit 19, a card inserting/discharging port 20, a bankbook inserting/discharging port 21, and a paper money inserting/discharging port 22. The respective units function in the same way as a normal ATM. Namely, the operation unit 19 is constructed of a display device for displaying messages relative to operation procedures, and an input device for inputting various items of information (a password number, an amount of money, a bank account number, etc.). The display device displays a message (image data) corresponding to data given from a processor (which will hereinafter be explained in detail) provided in the notes accepting apparatus. The input device outputs to the processor the data corresponding to a content of the operation by the user.

A card recorded with bank account data is inserted into the card inserting/discharging port 20. Provided in rear of the card inserting/discharging port 20 are a device for reading magnetic information stored on the card, a device for reading information written on the surface of the card, and a carry mechanism for supplying the card to these devices. The processor guides inward the card inserted into the card inserting/discharging port 20 and reads the information held on this card by controlling the carry mechanism and the devices. Then, the processor, on the basis of the information read therefrom, exchanges the information with a center computer connected via a communications line and recognizes an executable process.

Further, the card inserting/discharging port 20 is used also as a discharge port for a slip recorded with information pertaining to a transaction dealt with. Therefore, a mechanism for executing slip processing is also provided posterior to the card inserting/discharging port 20, and the processor controls this mechanism.

A banknote is inserted into the banknote inserting/discharging port 21. Provided in rear of the banknote inserting/discharging port 21 is a mechanism for printing a content of the transaction on the banknote inserted thereinto.

The paper money inserting/discharging port 22 functions as a port through which the paper money is inserted and discharged. A mechanism for actually treating the paper money is provided posterior to the paper money inserting/discharging port 22. As already explained, the conventional apparatus includes the same mechanism by which the paper money discriminated as inappropriate is simply returned to the paper money inserting/discharging port 22. The notes accepting apparatus in the first embodiment, however, includes a mechanism for detecting that forge paper money is inserted and notifying a management person such as a guard, etc. of this detection.

A construction of this mechanism provided in the notes accepting apparatus in the first embodiment will hereinafter be described in greater detail.

Figure 2:
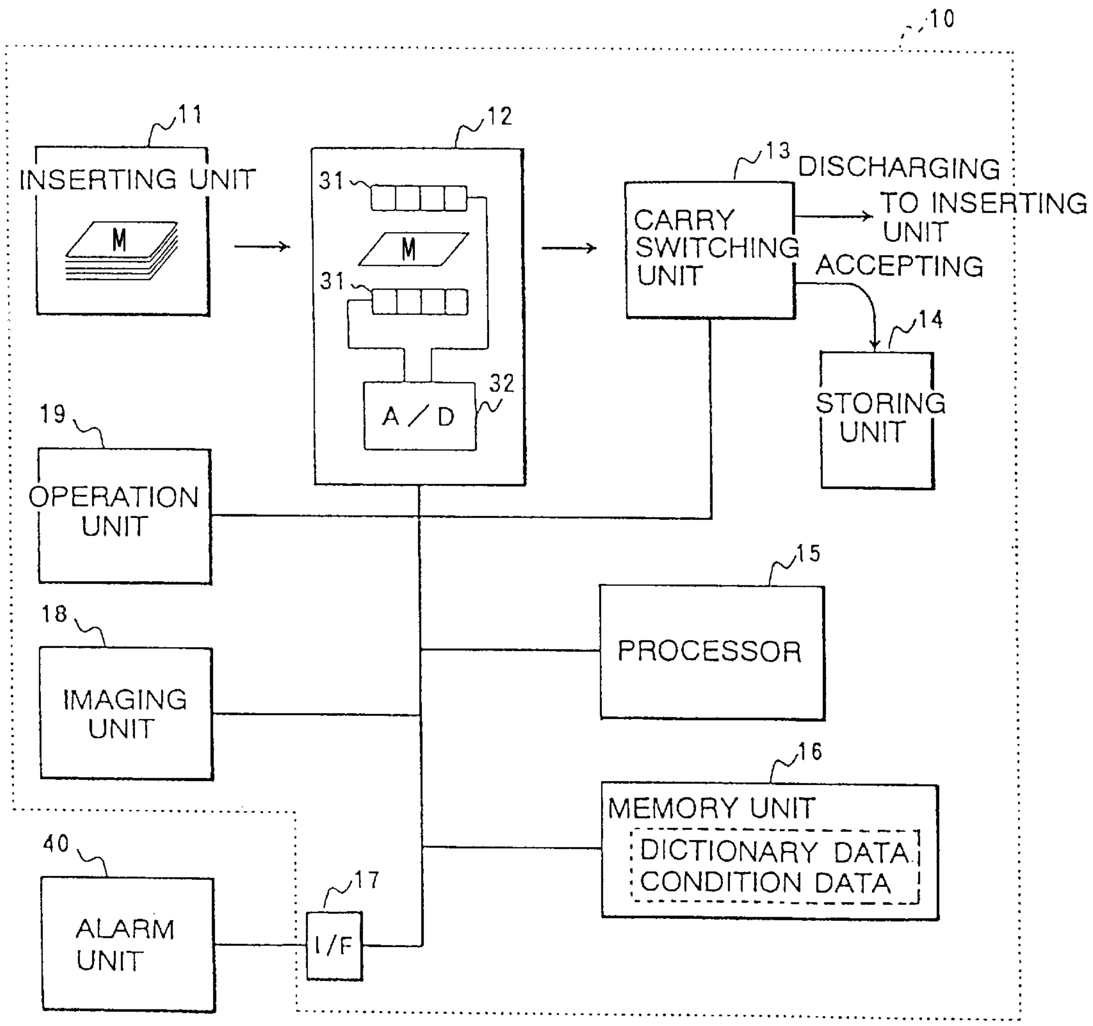
FIG. 2 is a view showing a construction of the notes accepting apparatus in the first embodiment.
Figure 3:
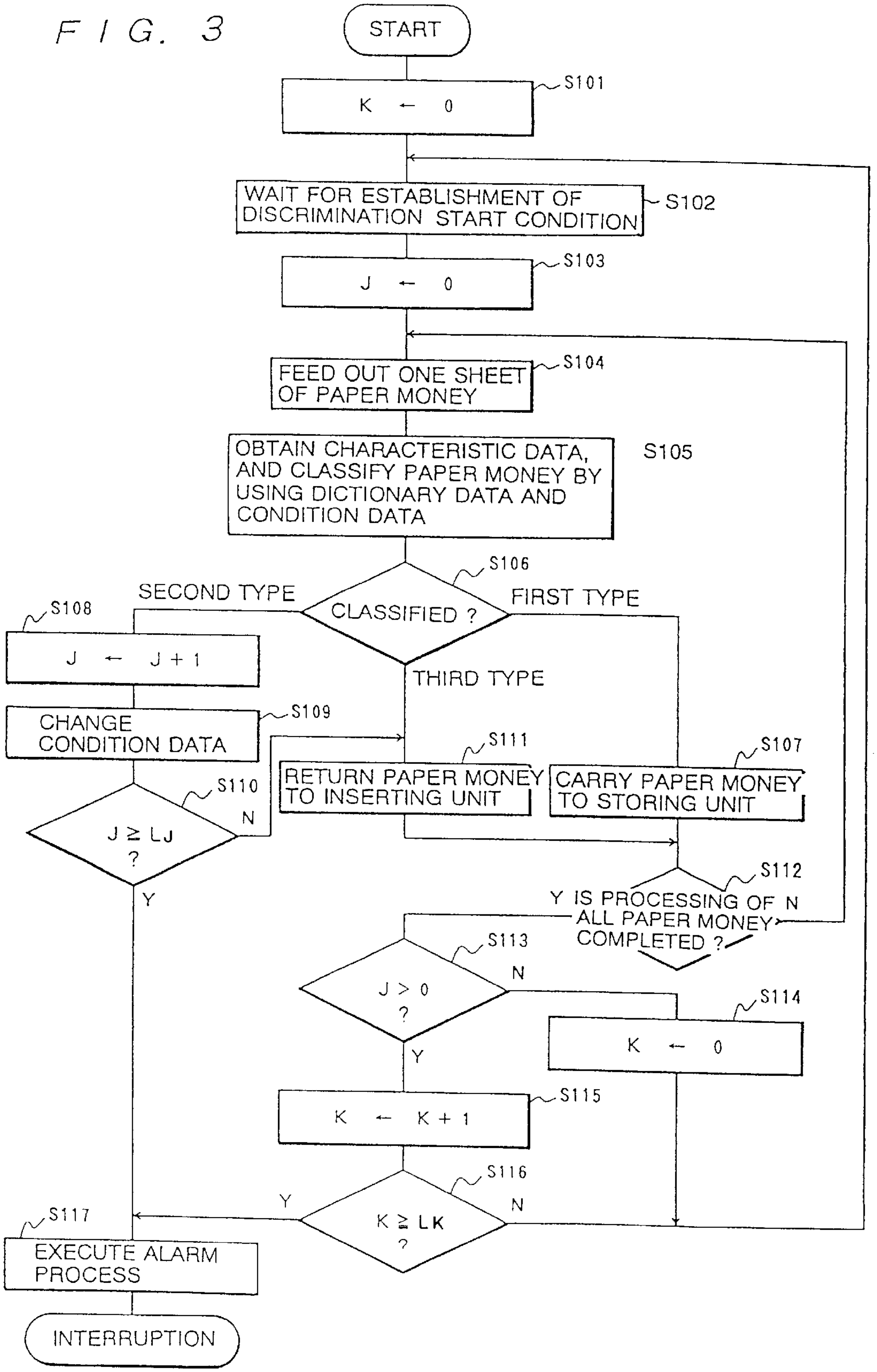
FIG. 3 is a flowchart showing operation procedures of the notes accepting apparatus in the first embodiment.

FIG. 2 is a construction of the notes accepting apparatus in the first embodiment. Note that the mechanisms relative to the card inserting/discharging port and the banknote inserting/discharging port, as explained above, operate in the same way with the corresponding mechanisms provided within the normal ATM, and hence the illustrations thereof are omitted in FIG. 2. Further, an illustration of the circuit for exchanging the information with the center computer is also omitted.

As shown in the Figure, the notes accepting apparatus in the first embodiment incorporates an inserting unit 11 (corresponding to the paper money inserting/discharging port 22 in FIG. 1), a sensor unit 12, a carry switching unit 13, a storing unit 14, a processor 15, a memory unit 16, and interface circuit (I/F) 17, an imaging unit 18 and an operation unit 19. Carry mechanisms for carrying paper money M as indicated by arrowheads are provided between the inserting unit 11, the sensor unit 12, the carry switching unit 13 and the storing unit 14, respectively. More specifically, the carry mechanism for carrying the paper money inserted into the inserting unit 11 to the sensor unit 12, is provided between the inserting unit 11 and the sensor unit 12. The carry mechanism for carrying the paper money passing through the sensor unit 12 to the carry switching unit 13, is provided posterior to the sensor unit 12. Provided further posterior to the carry switching unit 13 are the carry mechanism for carrying the paper money to the storing unit 14, and the carry mechanism for returning the paper money to the inserting unit 11.

The sensor unit 12, the carry switching unit 13, the processor 15, the memory unit 16, the I/F 17 and the imaging unit 18 are connected to each other via a bus for exchanging digital data. Further, the notes accepting apparatus 10 is connected to an alarm unit 40 via the I/F 17. Note that the alarm unit 40 is a device in a place where the apparatus management person such as the guard, etc, and notifies the management person of the fact that an abnormality arises (the forge paper money is used) by a sound and light under the control of the notes accepting apparatus 10.

The inserting unit 11 has a space for holding a plurality of sheets of paper money M inserted by the user for depositing, and a space to which the paper money discriminated as inappropriate is returned. Provided in the former space is a sensor for judging whether or not the paper money exists, and this sensor is connected to the processor via a circuit (unillustrated) for converting an output of the sensor into a digital signal.

The sensor unit 12 comprises a plurality of sensors 31 for obtaining a variety of items of characteristic data representing characteristics of the paper money M, and an A/D converting circuit 32 for converting the characteristic data in the form of analog signals outputted by these sensors 31 into characteristic data in the form of digital signals. Note that the sensor 31 provided in the sensor unit 12 includes an optical sensor for obtaining information about an outer shape and printed characters, a magnetic sensor for detecting an existence of magnetic ink, and a thickness sensor for detecting a thickness of the paper money.

The carry switching unit 13 has a function to supply one of the carry mechanisms provided anterior thereto with the paper money carried from the sensor unit 12. The storing unit 14 is so constructed as to be capable of storing the paper money according to the face values. The imaging unit 18 is a so-called video camera and is installed in a position where the imaging unit 18 is capable of photographing a figure (face) of the user for the present apparatus.

The memory unit 16 is constructed of a ROM, a RAM and a magnetic disk storage device. The ROM is stored with a program that defines operation procedures of the processor 15. The magnetic disk storage device is stored with dictionary data and condition data (which will be explained in greater detail later on).

Given hereinbelow is an explanation of an operation (control procedures of the processor 15) of the present notes accepting apparatus in response to a request for depositing.

When switching ON a power supply (alternatively when depressing a reset button), the processor 15 initializes, to "0", a variant K used to store the data for determining whether an alarm is given or not (step S101). Subsequently, the processor 15 moves to such a state as to monitor a signal transmitted from the operation unit 19, and goes into a standby process till a discrimination start condition is established (step S102). That is to say, the processor 15 indicates the operation unit 19 to receive the money, and is on standby till an insertion of the paper money into the inserting unit 11 is completed.

Then, when detecting that the insertion of the inserting unit 11 is completed, the processor 15 initializes, to "0", a variant J used for storing the number of sheets of paper money exhibiting a high probability of being forge notes (step S103), and starts control for feed one sheet of paper money from within the inserting unit 11 (step S104).

Next, the processor 15 obtains, from the sensor unit 12, various characteristic data about the single sheet of paper money fed out of the inserting unit 11. Then, the processor 15 classifies the paper money carried to the sensor unit 12 into a first type paper money defined as paper money exhibiting a high probability of being accepted, a second type paper money exhibiting a high probability of being forge notes, and a third type paper money other than the above two types by use of the obtained characteristic data, and the dictionary data and the condition data that are stored in the memory unit 16 (step S105). Further, in this step, the face values of the paper money classified into the first type paper money are specified.

The dictionary data used in step S105, when carrying to the sensor unit 12 in a non-stained state the paper money to be accepted by the notes accepting apparatus 10, serve as characteristic data outputted from the sensor unit 12. Further, the condition data serve as data determining a corresponding relationship between a difference between the characteristic data outputted by the sensor unit 12 and the dictionary data within the memory unit 16, and the classification into the three types. The memory unit 16 is stored with, as the condition data, a first item of condition data used when executing a process in step S105 at first, and a second item of condition data with a narrower range (stricter condition) of the characteristic data classified into the first type paper money than the first condition data.

If the paper money is classified into the first type paper money (step S106; the first type), the processor 15 controls the carry mechanism posterior to the sensor unit 13 and the route switching unit 13 so as to carry the paper money inspected by the sensor unit 12 to the storing unit 14 (step S107). Note that the processor 15 controls the respective units the paper money concerned is stored in a location corresponding to the face value within the storing unit 14 in this step.

Subsequently, the processor 15 judges whether or not the processes (discrimination) of all the paper money inserted are completed, based on the signal transmitted from the sensor provided in the inserting unit 11 (step S112). Then, if the processes of all the paper money are not completed (step S112; N), the processor 15 re-executes the processes from step S104. Namely, the processor 15 starts the process for the next paper money.

Further, if the paper money is classified into the second type paper money (step S106; the second type), i.e., if high of the probability of being a forge paper money, the processor 15 increments a value of the variant J by "1" (step S108). Then, the condition data used in step S105 are changed to the second condition data (step S109). Incidentally, this step is executed only when the condition data used for the classification are the first condition data.

After changing the condition data (or after changing the value of the variant J), the processor 15 judges whether $J \geqq L^J$ is established or not (step S110), where $L^J$ is a value set in advance of operating the notes accepting apparatus 10 by the management person.

If $J \geqq L^J$ is not established (step S110; N), the processor 15 controls the carry mechanism posterior to the sensor unit 12 and the route switching unit 13 so that the paper money inspected by the sensor unit 12 is sent back to the inserting unit 11 (step S111). Then, the processor 15 goes forward to step S112 and judges therein whether or not the paper money undiscriminated is left in the inserting unit 11.

On the other hand, if the $J \geqq L^J$ is established with respect to the incremented variant J (step S110; Y), the processor 15 starts operating the imaging unit 18, and notifies the alarm unit 40 of a predetermined control signal via the I/F 17, thereby executing an alarm process defined as a process of starting the operation of the alarm unit 40 (step S117). Then, the processes shown in the Figure are interrupted.

That is to say, the processor 15 judges whether or not the paper money should be accepted (whether or not the paper money is the first type paper money), and also judges whether or not the paper money has a high probability of being the forge paper money (whether or not the paper money is the second type paper money). Then, when $L^J$ or more sheets of paper money classified as the second type paper money are contained in the paper money inserted into the inserting unit 11, the processor 15 controls the alarm unit 40 to output an alarm. Further, the processor 15 starts operating the imaging unit 18 to record a figure of the operator just at that moment, and the processing is interrupted.

Further, if the paper money is classified as the third type paper money (step S106; the third type paper money), viz., if the paper money inspected by the sensor unit 12 has a smaller probability of being the forge paper money than the second type paper money and has a smaller probability of being the paper money to be accepted than the first type paper money, the processor 15 advances to step S111 without changing the value of J, and returns that paper money to the inserting unit 11. Subsequently, the processor 15 makes a judgement in step S112, and, if the discrimination of all the paper money is not completed, as already explained, executed the processes from step S104.

When detecting that the processes of all the paper money are completed (step S112; Y), the processor 15 judges whether J>0 is established or not (step S113). Then, if J>0 is not established (step S113; N), the processor 15 sets K to "0" (step S114), and returns to step S102. Whereas if J>0 is established (step S113; Y), the processor 15 judges whether or not $K \geqq L^K$ is established with respect to the incremented variant K (step S116). Note that $L^K$ is also, as in the case of $L^J$, a value set by the management person in advance of operating the notes accepting apparatus 10.

If $K \geqq L^K$ is established (step S116; Y), the processor 15 executes the alarm process as done when $J \geqq L^J$ is established (step S117). Namely, the processor 15 executes the alarm process also when detecting that the insertion of the paper money containing the second type paper money is consecutively repeated $L^K$ times. Incidentally, the reason why the variant K is initialized to "0" in step S114 is that the variant K is made retentive of the number of times with which the second type paper money is consecutively detected.

Whereas if $K \geqq L^K$ is not established (step S116; N), the processor 15 goes back to step S102 and is kept in the standby process till the discrimination start condition relative to a next transaction is satisfied.

As described above, the notes accepting apparatus 10 in the first embodiment controls the alarm unit 40 to output the alarm when $L^J$ or more sheets of paper money (the second type paper money) having the high probability of being the forge paper money are contained in the paper money inserted into the inserting unit 11, and starts photographing the operator. Therefore, if the forge paper money is inserted into the present notes accepting apparatus 10, it follows that the management person immediately takes a measure for that action. Further, the apparatus 10 is constructed to output the alarm not at such a stage that the single paper money exhibiting the high probability of being the forge paper money is detected but at such a stage that $L^J$ sheets of paper money are detected. Consequently, there must be an extremely small possibility of mistakenly outputting the alarm.

Moreover, the notes accepting apparatus 10, when less than $L^J$ sheets of paper money are inserted, does not output the alarm. If the insertion of such paper money is repeated $L^K$ times, however, the alarm is outputted. Generally, the user of the forge paper money has a tendency to try to use the forge paper money several times even when the acceptance is rejected, and hence the present notes accepting apparatus 10 is capable of detecting that even a small number of sheets of forge paper money are used.

Moreover, the present notes accepting apparatus 10 is constructed so that the judgement conditions relative to the first type paper money become stricter when detecting the second type paper money. To be specific, the judgement conditions are changed so that only the paper money having the condition data more approximate to the dictionary data is accepted at the stage where a possibility of the forge paper money having been used is recognized. Therefore, the present notes accepting apparatus 10 is an apparatus with a less possibility of mistakenly recognizing the forge paper money as appropriate and then accepting it.

Further, the figure of the user is recorded by the imaging unit 18, and hence, even if the guard is unable to immediately take a measure, a crucial piece of information about a criminal act can be obtained.

<Second Embodiment>

Figure 4:
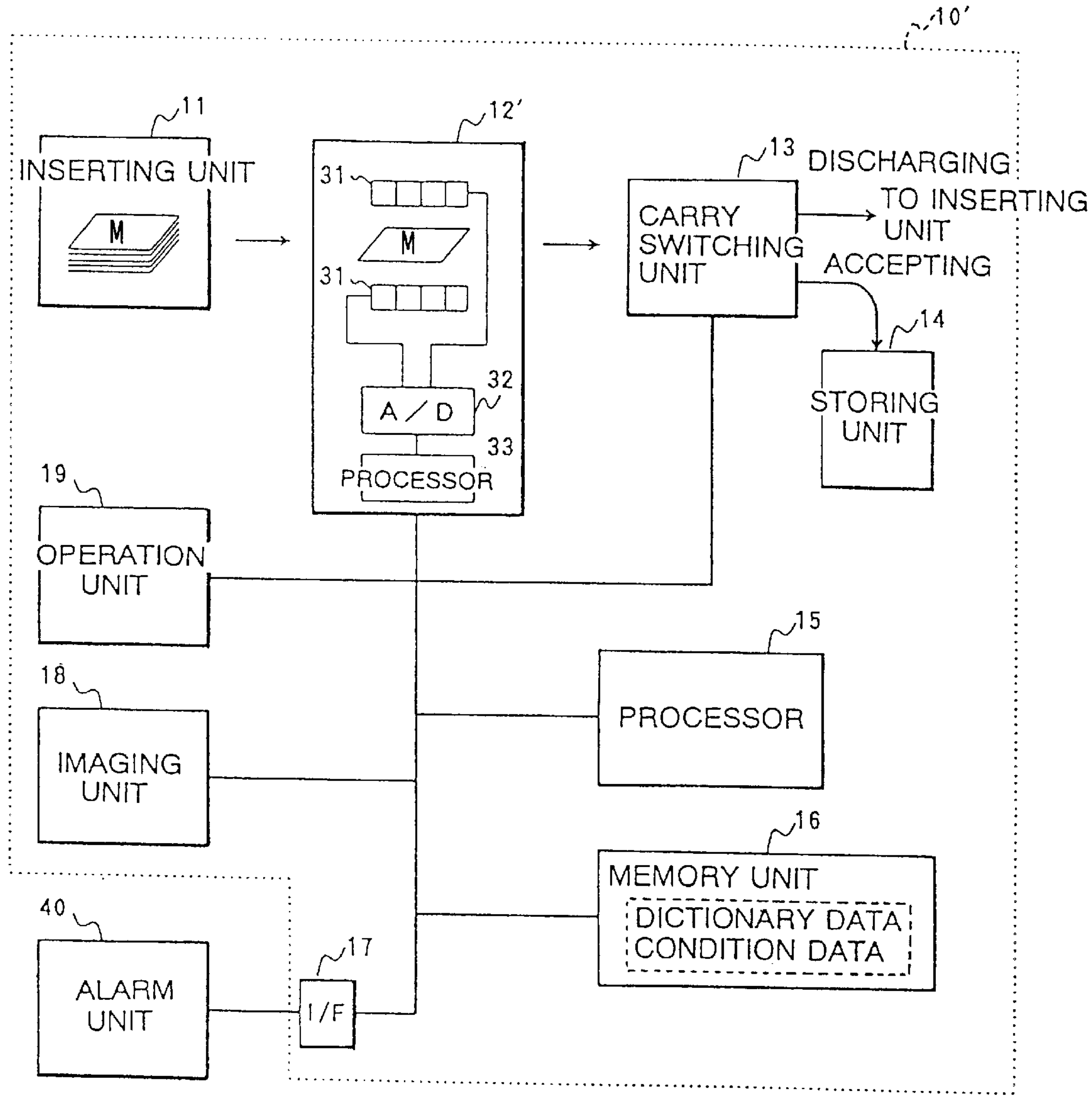
FIG. 4 is a diagram showing a construction of a notes accepting apparatus in a second embodiment.

FIG. 4 shows a construction of a notes accepting apparatus in a second embodiment. A notes accepting apparatus 10' in the second embodiment is, in the same way with the notes accepting apparatus 10 in the first embodiment, constructed to function as an ATM.

As illustrated in FIG. 4, the great majority of components constituting the notes accepting apparatus 10' are the same as those provided in the notes accepting apparatus 10. The notes accepting apparatus 0' is, however, provided with discriminating unit 12', consisting of a sensor 31, an A/D converting circuit 32 and a processor 33, as a substitute for the sensor unit 12.

The processor 33 in the discriminating unit 12' executes the same process as the process implemented in step S105 by the processor 15 in the notes accepting apparatus 10. More specifically, the processor 33 obtains the characteristic data detected by the sensor 31 through the A/D converting circuit 32. Subsequently, the processor 33 classifies the paper money carried from the inserting unit 11 into either the first type paper money or the third type paper money on the basis of the dictionary data and the condition data within the memory unit 16 as well as of the characteristic data. Then, the processor 33 notifies the processor 15 of this classification.

The processor 15 in the notes accepting apparatus 10' executes processes similar (essentially the same as) the processes by the processor 15 in the notes accepting apparatus 10 till the processes of all the paper money inserted into the inserting unit 11 are finished. The processor 15 in the notes accepting apparatus 10', however, does not change the condition data (does not change the judgement conditions), and executes a process different from that by the processor 15 in the notes accepting apparatus 10 when the processes of all the paper money are completed.

Figure 5:
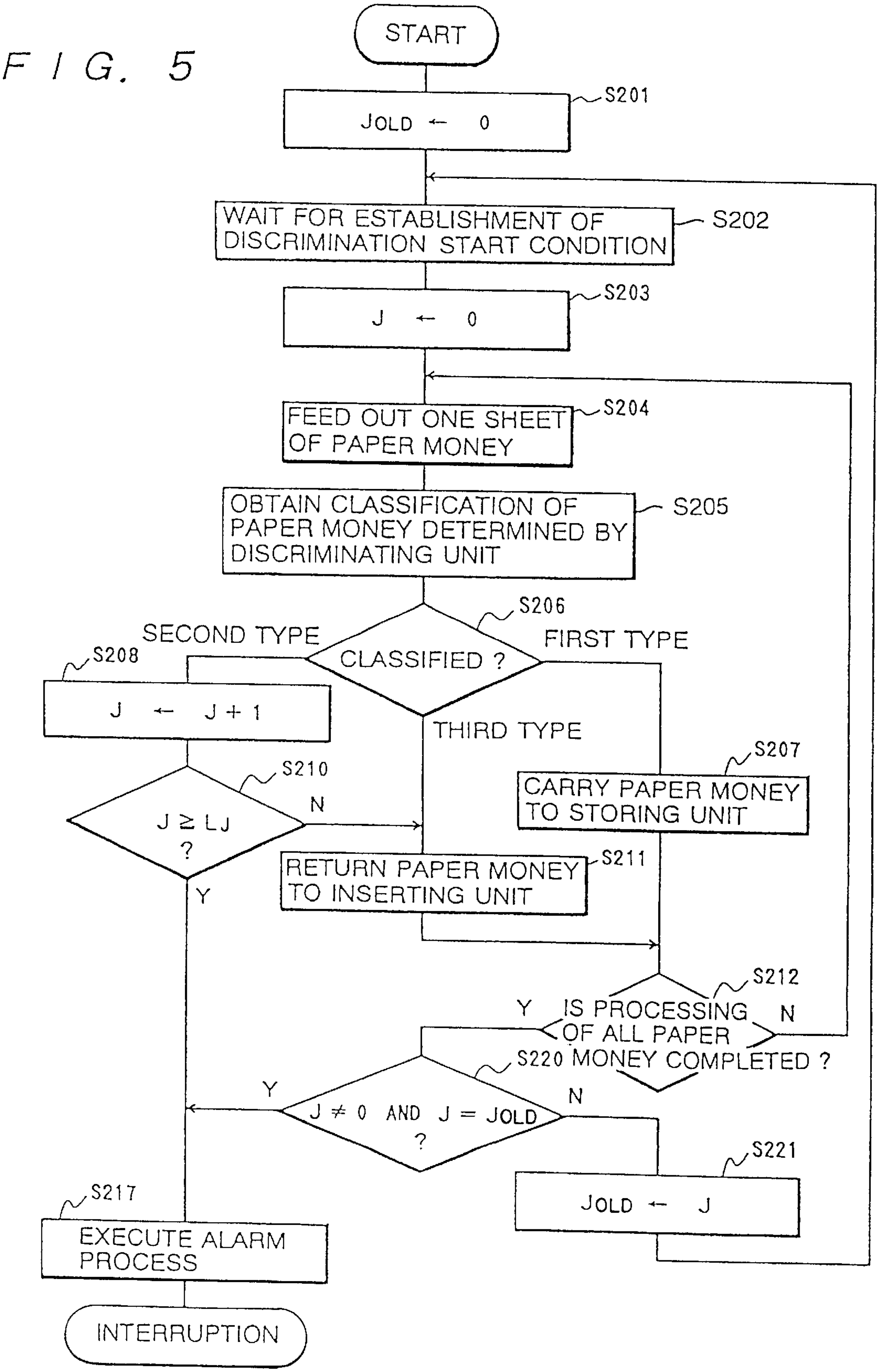
FIG. 5 is a flowchart showing operation procedures of the notes accepting apparatus in the second embodiment.
Figure 6:
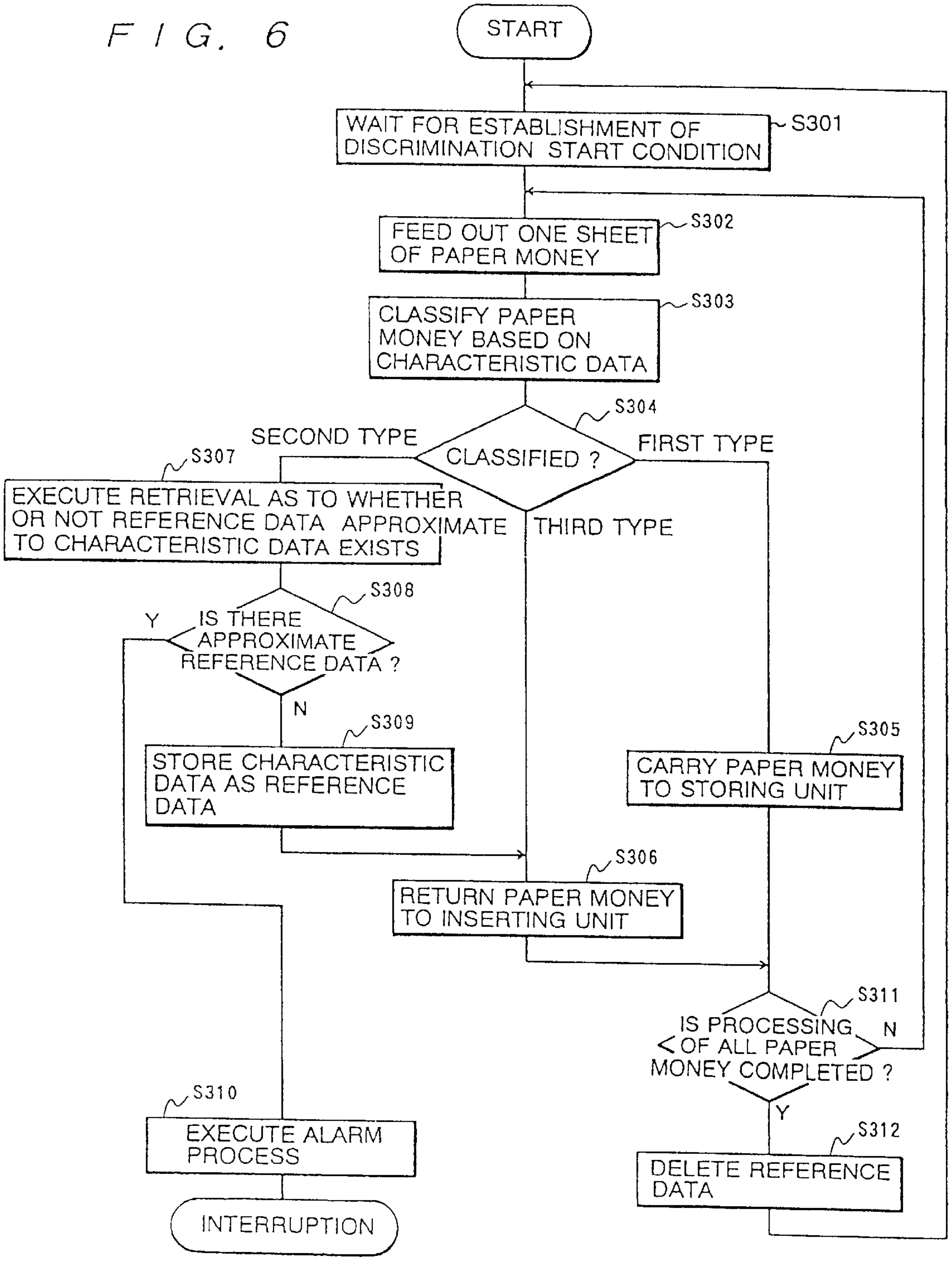
FIG. 6 is a flowchart showing the operation procedures of the notes accepting apparatus in the second embodiment.

Control procedures by the processor 15 in the notes accepting apparatus 10' will be explained with reference to FIG. 5. Note that processes executed in steps S201 through S208, steps S210 to S212 and S217 till the discriminations of all the paper money inserted into the inserting unit 11 are, as explained above, substantially the same as those executed in steps S101 to S108, S110 to S112 and S117, excluding such processes that a variant $J^{OLD}$ is set to “0” in step S201 and a classification determined by a discriminating unit 12' is obtained from the discriminating unit 12' in step S205. Therefore, an explanation of the processes executed in those steps is omitted.

Now, the processor 15 in the notes accepting apparatus 10 in the first embodiment judges whether or not the paper money classified as the second type paper money exists just (whether or not J is over 0) when the discriminations of all the paper money are completed. In contrast with this, the processor 15 in the notes accepting apparatus 10' in the second embodiment, as shown in the Figure, judges whether or not $j \neq 0$ and $J=J^{OLD}$ are established (step S20) when the discriminations of all the paper money are completed (step S21; Y). Then, if $J \neq 0$ and $J=J^{OLD}$ are not established (step S220; N), the processor 15 sets a value of J to $J^{OLD}$ (step S221), and returns to step S202. Whereas if $J \neq 0$ and $J=J^{OLD}$ are established (step S220; Y), the processor 15 advances to step S117 and executes the alarm process.

To be specific, in the notes accepting apparatus 10' in accordance with the second embodiment, the variant $J^{OLD}$ is retentive of the number of sheets of the second type paper money contained in the paper money (discriminated last time) inserted last time into the inserting unit. Then, the alarm process is executed also when the number of sheets ($J^{OLD}$) of the second type paper money of the last time and the number of sheets (J) of the second type paper money contained in the paper money inserted this time into the inserting unit 11, are not “0” but are identical with each other.

Thus, in the notes accepting apparatus 10' in the second embodiment, the condition for executing the alarm process against using less than $L^J$ sheets of the second type paper money (the forge paper money), is stricter than in the notes accepting apparatus 10 in the first embodiment wherein the $L^K$ is set to “2”. Therefore, according to the notes accepting apparatus 10' in the second embodiment, the use of a small number of sheets of forge paper money can be detected more precisely.

<Third Embodiment>

A notes accepting apparatus in a third embodiment has the same construction as that of the notes accepting apparatus in the first embodiment. A processor in the notes accepting apparatus in the third embodiment, however, controls the respective units in procedures different from the processor 15 within the notes accepting apparatus 10.

Hereinafter, an operation of (control procedures by the processor) of the notes accepting apparatus in accordance with the third embodiment in response to a request for depositing, will be explained.

When switching ON the power supply, the processor moves to such a state as to monitor signal transmitted from the operation unit, and goes into a standby process till the discrimination start condition is established (step S301). Namely, the processor is on the standby till the insertion of the paper money into the inserting unit is completed after the operation unit has been indicated to receive the paper money. Then, the processor, when detecting that the insertion of the paper money into the inserting unit is completed, starts the control to feed one sheet of paper money from within the inserting unit (step S302).

Subsequently, the processor obtains from the sensor unit various items of characteristic data about the single paper money fed out of the inserting unit. Then, the processor classifies the paper money carried to the sensor unit into the first type paper money defined as paper money exhibiting the high probability of being accepted, the second type paper money exhibiting the high probability of being forge notes, and the third type paper money other than the above two types by use of the obtained characteristic data, and the dictionary data and the condition data that are stored in the memory unit (step S304). Note that the dictionary data are the same as the dictionary data held in the notes accepting apparatus 10 in the first embodiment, while the condition data are the same as the first condition data held in the notes accepting apparatus in the first embodiment.

If the paper money is classified as the first type paper money (step S304; the first type paper money), the processor controls the carry mechanism posterior to the sensor unit and the route switching unit so as to carry the paper money inspected by the sensor unit to the storing unit (step S307). Then, the processor judges whether or not the processes (discrimination) of all the paper money inserted are completed (step S311), and, if not completed (N), returns to step S302, wherein the processes for the next paper money are started.

If the paper money is classified into the third type paper money (step S306; the third type), the processor controls the respective units so that the paper money inspected by the sensor unit is returned to the inserting unit (step S306). Thereafter, if the processes (the discrimination) of all the paper are not completed (step S311; N), the processing returns to step S302, and the processes for the next paper money are started.

If the paper money is classified as the second type paper money (step S307; the second type), the processor makes a retrieval as to whether reference data with a difference from the characteristic data which difference falls within a prescribed value, exist in the memory unit or not (step S307). Herein, the reference data are the characteristic data of the paper money classified as the second type paper money in the past, and are stored in the memory unit in step S309 that will be described later on.

When it is known as a result of the retrieval in step S307 that no approximate reference data exist (step S308; N), the processor stores the memory unit with the characteristic data as the reference data (step S309). Note that the storage in this step is conducted in such a form as to add new reference data to the reference data already stored therein. Thereafter, the processor sends the paper money classified as the second paper money back to the inserting unit (step S306). If the processes (the discrimination) of all the paper money are not completed (step S311; N), the next paper money is fed out of the inserting unit (step S302).

On the other hand, it is known as a result of the retrieval in step S307 that the approximate reference data exist (step S308; Y), the processor executes the alarm process that has already been explained (step S310), and interrupts the processing.

Then, if the processes of all the paper money are completed without any interruption of the processing (step S311; Y), the processor deletes the reference data stored in the memory unit (step S312) and, returning to step S301, goes into the standby process till a next request for depositing.

Namely, in the notes accepting apparatus in the third embodiment, the alarm process is executed when two sheets of paper money classified as the second type paper money and having an extreme approximation of the characteristic data, are contained in the paper money inserted. Therefore, according to the notes accepting apparatus in the third embodiment, it is feasible to precisely detect that a plurality of sheets of the forge paper money created normally in the same procedures.

<Modified Embodiment>

The notes accepting apparatuses in the first through third embodiments can be modified in a variety of forms. For example, a notes accepting apparatus for discriminating the paper money may be constructed without changing the condition data by modifying the notes accepting apparatus in the first embodiment. The notes accepting apparatuses in the second and third embodiments can be also constructed so that reversely the condition data are changed. Furthermore, it is feasible to construct a notes accepting apparatus in which the alarm process is executed also when the number of sheets of the second type paper money detected is over a predetermined value on the basis of the notes accepting apparatus in the third embodiment. Moreover, the alarm process may be executed in consideration of a rate at which the second type paper money occupies the number of all the paper money.

What is claimed is:

1. A notes accepting apparatus comprising:

a holding unit temporarily holding plural sheets of notes inserted;

a fetching unit fetching the plural sheets of notes, sheet by sheet, held by said holding unit;

a characteristic data outputting unit outputting predetermined kinds of characteristic data about one sheet of note fetched by said fetching unit;

a classifying unit classifying the notes fetched by said fetching unit into any one type of notes among first type notes exhibiting a high probability of being accepted, second type notes exhibiting a high probability of being forged notes, and third type notes exhibiting a smaller probability of being accepted than the first type notes and a smaller probability of being the forged notes than the second type notes, on the basis of the predetermined kinds of characteristic data outputted by said characteristic data outputting unit and predetermined condition data;

a storing unit storing the notes classified as the first type notes by said classifying unit;

a counting unit counting the number of sheets of the notes classified as the second type notes by said classifying unit during a period until said fetching unit fetches all of plural sheets of the notes held by said holding unit; and an information outputting unit outputting information that notes having a high probability of being forged were inserted when a count value by said counting unit exceeds a predetermined value.

2. A notes accepting apparatus comprising:

a holding unit temporarily holding plural sheets of notes inserted;

a fetching unit fetching the plural sheets of notes, sheet by sheet, held by said holding unit;

a characteristic data outputting unit outputting predetermined kinds of characteristic data about one sheet of note fetched by said fetching unit;

a classifying unit classifying the notes fetched by said fetching unit into any one type of notes among first type notes exhibiting a high probability of being accepted, second type notes exhibiting a high probability of being forged notes, and third type notes exhibiting a smaller probability of being accepted than the first type notes and a smaller probability of being the forged notes than the second type notes, on the basis of the predetermined kinds of characteristic data outputted by said characteristic data outputting unit and predetermined condition data;

a storing unit storing the notes classified as the first type notes by said classifying unit;

a judging unit judging whether or not the notes classified as the second type notes by said classifying unit exist in the plural sheets of notes held by said holding unit; and an information outputting unit outputting information that notes having a high probability of being forged were inserted, when said judging unit judges consecutively a predetermined number of times that the notes classified as the second type notes exist.

3. A notes accepting apparatus comprising:

a reference data storing unit storing reference data;

a holding unit temporarily holding plural sheets of notes inserted;

a fetching unit fetching the plural sheets of notes, sheet by sheet, held by said holding unit;

a characteristic data outputting unit outputting predetermined kinds of characteristic data about one sheet of note fetched by said fetching unit;

a classifying unit classifying the notes fetched by said fetching unit into any one type of notes among first type notes exhibiting a high probability of being accepted, second type notes exhibiting a high probability of being forged notes, and third type notes exhibiting a smaller probability of being accepted than the first type notes and a smaller probability of being the forged notes than the second type notes, on the basis of the predetermined kinds of characteristic data outputted by said characteristic data outputting unit and predetermined condition data;

a storing unit storing the notes classified as the first type notes by said classifying unit;

an information outputting unit outputting information that notes having a high probability of being forged were inserted, when said reference data storing unit is stored with reference data conceived the same as the characteristic data of the notes classified as the second type notes by said classifying unit; and a writing unit writing, when said reference data storing unit is not stored with the reference data conceived the same as the characteristic data classified as the second type notes by said classifying unit, the characteristic data as reference data to said reference data storing unit.

4. A notes accepting apparatus according to claim 1, further comprising:

a classification control unit controlling, when said classifying unit classifies the notes fetched by said fetching unit as the second type notes by use of the condition data, said classifying unit to perform the classification thereafter by use of second condition data having a narrower range of characteristic data for classifying notes into the first type notes.

5. A notes accepting apparatus according to claim 1, further comprising:

a photographing unit photographing a person who inserts the notes into said holding unit; and a photography control unit making said photographing unit function when the count value by said counting unit exceeds the predetermined value.

6. A notes accepting apparatus according to claim 2, further comprising:

a photographing unit photographing a person who inserts the notes into said holding unit; and a photography control unit making said photographing unit function when said judging unit judges consecutively a predetermined number of times that notes of the second type exist.

7. A notes accepting apparatus comprising:

a holding unit to temporarily hold plural sheets of notes inserted;

a fetching unit to fetch the plural sheets of notes held by said holding unit, sheet-by-sheet;

a characteristic data outputting unit to output predetermined kinds of characteristic data about one sheet of note fetched by said fetching unit;

a classifying unit to classify the notes fetched by said fetching unit into notes of a first type exhibiting a high probability of being accepted, notes of a second type exhibiting a high probability of being forged or, notes of a third type exhibiting a smaller probability of being accepted than the notes of the first type and a smaller probability of being the forged than the notes of the second type, on the basis of the predetermined kinds of characteristic data output by said characteristic data outputting unit and predetermined condition data;

a storing unit to store the notes of the first type;

a counting unit to count the number of sheets of notes of the second type until said fetching unit fetches all of plural sheets of the notes held by said holding unit;

an information outputting unit to output information indicating that notes having a high probability of being forged were inserted, when said counting unit counts more than a predetermined number of notes of the second type;

a photographing unit to photograph a person who inserts the notes into said holding unit; and a photography control unit making said photographing unit function when said counting unit counts more than a predetermined number of notes of the second type.

8. A notes accepting apparatus comprising:

a holding unit to temporarily hold plural sheets of notes inserted;

a fetching unit to fetch the plural sheets of notes held by said holding unit, sheet-by-sheet;

a characteristic data outputting unit to output predetermined kinds of characteristic data about one sheet of note fetched by said fetching unit;

a classifying unit to classify the notes fetched by said fetching unit into notes of a first type exhibiting a high probability of being accepted, notes of a second type exhibiting a high probability of being forged or, notes of a third type exhibiting a smaller probability of being accepted than the notes of the first type and a smaller probability of being the forged than the notes of the second type on the basis of the predetermined kinds of characteristic data output by said characteristic data outputting unit and predetermined condition data;

a storing unit to store the notes of the first type;

a judging unit to judge whether or not the holding unit held plural notes the of second type;

an information outputting unit to output information indicating that notes having a high probability of being forged were inserted when said judging unit judges consecutively a predetermined number of times that the notes of the second type exist;

a photographing unit to photograph a person who inserts notes into said holding unit; and a photography control unit making said photographing unit function when said judging unit judges consecutively a predetermined number of times that notes of the second type exist.

9. A notes accepting apparatus comprising:

a holding unit to temporarily hold a plurality of notes inserted;

a fetching unit to fetch the plurality of notes held by said holding unit, note-by-note;

a classifying unit to classify the notes fetched by said fetching unit into notes of a first type exhibiting a high probability of being accepted, notes of a second type exhibiting a high probability of being forged or, notes of a third type exhibiting a smaller probability of being accepted than the notes of the first type and a smaller probability of being the forged than the notes of the second type;

a counting unit to count the number of notes of the second type; and an information outputting unit to output information indicating that notes having a high probability of being forged were inserted, when said counting unit counts more than a predetermined number of notes of the second type.

10. A notes accepting unit according to claim 9, further comprising a photographing unit to photograph a person who inserts notes into said holding unit when said counting unit counts more than a predetermined number of notes of the second type.

* * * * *